(12) United States Patent
Hill

(10) Patent No.: US 8,727,091 B2
(45) Date of Patent: May 20, 2014

(54) TORQUE LIMITER

(75) Inventor: Edward George Hill, Redditch (GB)

(73) Assignee: Goodrich Actuation Systems Limited (GB)

( * ) Notice: Subject to any disclaimer, the term of this patent is extended or adjusted under 35 U.S.C. 154(b) by 22 days.

(21) Appl. No.: 13/488,534

(22) Filed: Jun. 5, 2012

(65) Prior Publication Data

US 2012/0318627 A1  Dec. 20, 2012

(30) Foreign Application Priority Data

Jun. 16, 2011  (GB) ..................................... 1110131

(51) Int. Cl.
  *F16D 43/206*  (2006.01)
  *F16D 7/08*   (2006.01)

(52) U.S. Cl.
  USPC ................. 192/56.57; 192/56.62; 464/36

(58) Field of Classification Search
  USPC ..................... 192/56.54, 56.57, 56.62; 464/36
  See application file for complete search history.

(56) References Cited

U.S. PATENT DOCUMENTS

| | | | | |
|---|---|---|---|---|
| 2,587,712 A | * | 3/1952 | Dodge | 192/103 A |
| 3,185,275 A | * | 5/1965 | Orwin | 192/56.57 |
| 4,263,996 A | * | 4/1981 | Putney | 192/56.57 |
| 4,294,340 A | | 10/1981 | Kunze | |
| 4,538,715 A | | 9/1985 | Konrad et al. | |
| 4,694,944 A | * | 9/1987 | Schmidt | 192/56.5 |
| 5,630,490 A | | 5/1997 | Hudson et al. | |
| 7,128,193 B2 | | 10/2006 | Murakami | |

FOREIGN PATENT DOCUMENTS

| | | |
|---|---|---|
| DE | 3438374 | 10/1984 |
| EP | 2 045 480 | 4/2009 |
| EP | 2 068 027 | 6/2009 |
| GB | 1 449 623 | 9/1976 |

OTHER PUBLICATIONS

European Search Report dated Sep. 11, 2012.
British Search Report dated Oct. 13, 2011.

* cited by examiner

Primary Examiner — Richard M. Lorence
(74) Attorney, Agent, or Firm — Cantor Colburn LLP

(57) ABSTRACT

A torque limiter device comprises a rotatable input 10 having an input flange 20 associated therewith, a rotatable output 12 having an output flange 22 associated therewith, the input flange 20 and the output flange 22 having opposing transmission pockets 26a, 26b formed therein, a torque transmission element 28 locatable within the opposing transmission pockets 26a, 26b of the input and output flanges 20, 22 to transmit torque therebetween, at least one disengagement pocket 32 arranged to receive the torque transmission element 28 when the torque transmission element 28 is in a disengaged position in which torque is not transmitted between the input flange 20 and the output flange 22, and resilient biasing means 34 biasing the torque transmission element 28 towards a transmission position in which it is located within the opposing transmission pockets 26a, 26b.

11 Claims, 2 Drawing Sheets

TORQUE LIMITER

This invention relates to a torque limiter device operable to limit the transmission of torque between an input and an output. In particular the invention relates to such a device suitable for use in aerospace applications, and in which resetting of the device is possible after removal of the application of an excess torque thereto.

U.S. Pat. No. 5,630,490 describes a torque limiter device including an input shaft, an output shaft, and a clutch located between, and operable to transmit torque between, the input shaft and the output shaft. Disengagement of the clutch allows the input shaft to rotate freely. The clutch, in this arrangement, comprises a series of balls located within pockets provided in flanges associated with the input shaft and the output shaft. The flanges are spring biased towards one another, trapping the balls in the pockets in such a manner as to allow torque to be transmitted between the flanges, and hence between the input and output shafts, by way of the balls. In such an arrangement, in the event of an excessive torque being applied, the balls will tend to ride out of their respective pockets, forcing the flanges apart in order to achieve such movement. Once the balls have ridden out of their respective pockets and fallen into deeper receiving pockets, it will be appreciated that torque transmission between the flanges, and hence between the input and output shafts, is terminated.

Whilst such an arrangement can operate satisfactorily as a torque limiter device, it has the disadvantage that re-setting of the torque limiter device after removal of the applied torque requires the torque limiter device to be dismantled and rebuilt in order to return the balls into their respective pockets. This is a complex and time consuming process, and so is undesirable.

A similar arrangement is described in U.S. Pat. No. 7,128, 193. In the U.S. Pat. No. 7,128,193 arrangement, the pockets in which the balls are received when the device is disengaged are of an asymmetric shape.

GB1449623 describes a torque transmission arrangement including a series of torque transmission balls located within pockets formed in a drive member, and projecting into pockets formed in a clutch member. Depending upon the position of the clutch member, torque may be transmitted between the drive member and the clutch member via the torque transmission balls. The clutch member is spring biased towards a position in which torque is transmitted.

It is an object of the invention to provide a torque limiter device of relatively simple and convenient form and in which re-setting of the torque limiter device can be achieved.

According to the present invention there is provided a torque limiter device comprising a rotatable input having an input flange associated therewith, a rotatable output having an output flange associated therewith, the input flange and the output flange having opposing transmission pockets formed therein, a torque transmission element locatable within the opposing transmission pockets of the input and output flanges to transmit torque therebetween, at least one disengagement pocket arranged to receive the torque transmission element when the torque transmission element is in a disengaged position in which torque is not transmitted between the input flange and the output flange, and resilient biasing means biasing the torque transmission element towards a transmission position in which it is located within the opposing transmission pockets.

With such an arrangement, if an excess torque is applied, the torque transmission element will ride out of the torque transmission pockets and locate within the disengagement pocket, thereby terminating or significantly reducing the transmission of torque between the input and output flanges. After removal of the excess applied torque, the application of drive in the opposite direction, in combination with the biasing of the torque transmission element, allows the torque transmission element to be driven back to the transmission position, thereby re-setting the torque limiter device. The biasing of the torque transmission element thus assists in re-setting of the device.

Conveniently, the disengagement pocket has a ramped or sloped surface along which the torque transmission element rides to return from the disengaged position to the transmission position. The ramped or sloped surface is conveniently relatively gently sloped, and the profile of the disengagement pocket is conveniently such that an opposing surface thereof is of steeper form than the relatively gentle slope of the aforementioned ramped or sloped surface. The provision of a relatively gently sloped surface of this form assists in allowing the passage of the torque transmission element from the disengaged position to the transmission position. The steeper surface limits movement of the transmission element, thereby ensuring that once disengaged, the transmission element is retained within the disengagement pockets and so the device remains in a disengaged condition until it is actively re-set.

Preferably, the disengagement pocket is formed on the input flange. However, this need not always be the case and the disengagement pocket could be formed on the output flange.

Conveniently, a second disengagement pocket is provided to the opposite side of the transmission pocket to the aforementioned disengagement pocket. Such an arrangement permits torque limitation in both operating directions.

The torque limiter device may include a plurality of torque transmission elements and associated torque transmission pockets and disengagement pockets.

The input and output flanges are conveniently spring biased towards one another, for example by a disc spring pack.

The or each torque transmission element is conveniently held captive to a support element, for example in the form of a support cage. The resilient biasing means is conveniently arranged to bias the support element, and hence the or each torque transmission element, towards a predetermined angular position relative to the input flange. The resilient biasing means conveniently comprises a spring means, for example torsion spring means, carried by the input flange and engaged with the support element so as to bias the support element towards a predetermined angular position relative to the input flange in which the torque transmission element carried by the support element engages in the transmission pocket. Whilst the use of a torsion spring means is mentioned hereinbefore, it will be appreciated that, for example, compression springs or tension springs could be used.

The invention will further be described, by way of example, with reference to the accompanying drawings, in which.

Figure 1:
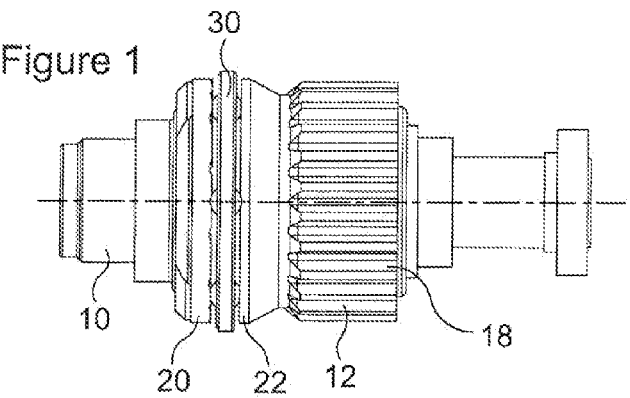
FIG. 1 is a view illustrating a torque limiter device according to one embodiment of the invention.
Figure 2:
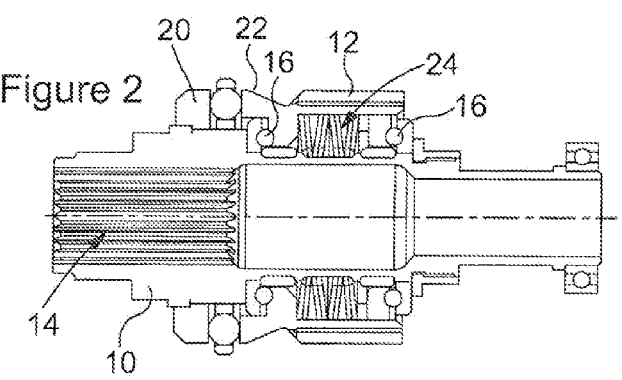
FIG. 2 is a sectional view illustrating the device of FIG. 1.

Referring firstly to FIGS. 1 and 2 there is illustrated a torque limiter device operable to limit the transmission of torque between an input shaft 10 and a rotatable output 12. The input shaft 10 includes, at one end thereof, a splined input region 14 for connection to a rotatable shaft. If desired, the other end of the input shaft 10 may be connected to a shaft to permit the onward transmission of drive to another device (not shown). The rotatable output 12 encircles the input shaft 10 and is supported thereon by bearings 16 so as to allow the output 12 to rotate relative to the input shaft 10. The output 12 is provided, on its outer surface, with gear teeth or spline formations or the like 18 to allow the transmission of drive therefrom to another device (not shown).

Mounted upon the input shaft 10 is an input flange 20. The manner in which the input flange 20 is mounted is such that the input flange 20 is axially fixed and angularly fixed relative to the input shaft 10. If desired, these parts could be formed integrally with one another but, for manufacturing convenience, it may be preferred to manufacture them as separate components.

A part of the output 12 facing the input flange 20 forms an output flange 22. The output 12, and hence the output flange 22, is capable of limited axial movement relative to the input shaft 10 and input flange 20, such movement being accommodated by the bearings 16, and a disc spring pack 24 is provided to apply a biasing load to the output 12, and hence the output flange 22, urging the output flange 22 axially towards the input flange 20. The bearings 16, whilst accommodating such movement, serve to limit the distance by which the output 12 can be moved.

Figure 3:
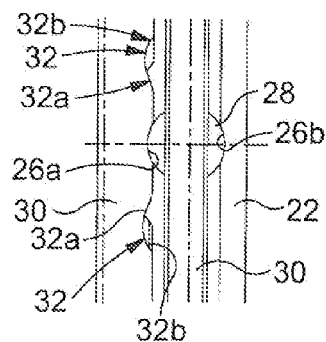
FIG. 3 is a view to an enlarged scale illustrating part of the device of FIG. 1.

As shown in FIGS. 1 and 3, the surfaces of the input and output flanges 20, 22 that face one another are provided with transmission pockets 26a, 26b. The transmission pockets 26a, 26b are in the form of relatively shallow pockets or recesses arranged such that, with each pocket 26a aligned with a corresponding pocket 26b, a transmission element 28 in the form of a steel ball or the like can be located partially within a respective pocket 26a and the corresponding pocket 26b, the spring biasing of the output flange 22 ensuring that the transmission element 28 is held firmly in position with the result that rotation of the input shaft 10 can be transmitted through the input flange 20, transmission element 28 and output flange 22 to the output 12.

Conveniently, a plurality of transmission elements 28, and respective transmission pockets 26a, 26b, are provided. By way of example, six such elements 28 may be provided. However, it will be appreciated that the invention is not restricted in this regard, and other numbers of elements could be used if desired. The transmission elements 28 are, as illustrated, supported by a support element or cage 30 which holds the support elements 28 in the correct radial positions and correctly spaced apart from one another. As best shown in the embodiment shown in FIG. 5, and as shown diagrammatically in FIGS. 4a to 4f, the cage 30 is connected, by a resilient biasing means, to the input flange 20 so that the cage 30, and transmission elements 28, is biased to a predetermined angular position relative to the input flange in which the transmission elements 28 are aligned with the respective transmission pockets 26a.

As shown in FIG. 3, to each side of each transmission pocket 26a, the input flange 20 is provided with disengagement pockets 32. The disengagement pockets 32 are deeper than the transmission pockets 26a, and are of asymmetric form, having a relatively gently sloped surface 32a closest to the associated transmission pocket 26a, and a more steeply sloped surface 32b remote from the associated transmission pocket 26a.

Figure 4A:
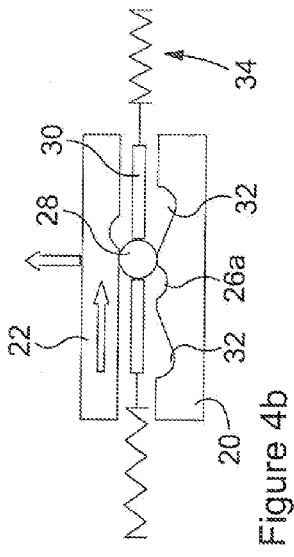
FIGS. 4a to 4f are diagrams illustrating the operation of the device.
Figure 4C:
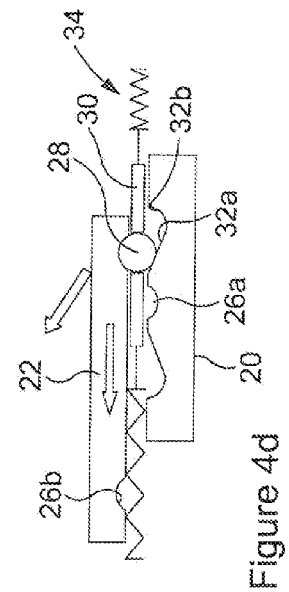

In use, as outlined hereinbefore, rotation of the input shaft 10 can be transmitted through the input flange 20, transmission elements 28 and output flange 22 to the output 12, thereby allowing the transmission of drive between, for example, a drive shaft connected to the input shaft 10 and a device driven by the output 12. In normal use, the spring load applied by the spring pack 24 to the output 12 and output flange 22 is sufficient to ensure that the transmission elements 28 are held in position in the transmission pockets 26a, 26b, and thus that torque is transmitted through the torque limiter device. FIG. 4a illustrates the torque limiter device in this mode of operation.

In the event that, for example, the device driven from the output 12 becomes jammed or a brake is applied thereto, the torque limiter device operates to terminate or reduce the continued transmission of torque from the input shaft 10 to the output 12. The resistance to rotation of the output 12, whilst drive continues to be applied to the input shaft 10, results in relative angular movement occurring between the input and output flanges 20, 22. In order for this movement to occur, the output flange 22 is forced axially away from the input flange 20 against the action of the loading applied by the spring pack 24 as the transmission elements 28 ride out of the transmission pockets 26a, 26b (see FIG. 4b). As the relative movement continues, a point will be reached at which each transmission element 28 enters one or other of the associated disengagement pockets 32 (see FIG. 4c), depending upon the direction of relative angular movement of the input and output flanges 20, 22. Once the transmission elements 28 enter the associated disengagement pockets 32, it will be appreciated that the spring biasing applied by the spring pack 24 to the output flange 22 results in the output flange 22 moving, axially, relative to the input flange 20. The distance through which the output flange 22 is permitted to move by the bearings 16, relative to the depth of the disengagement pockets 32, is insufficient for the transmission elements 28 to engage against, and transmit significant torque between, the input and output flanges 20, 22. It will be appreciated that, during such movement, the transmission elements 28, and the support cage 30 associated therewith, is moved against the action of the biasing load applied thereto. Continued movement of the transmission elements 28 in a direction away from the associated transmission pockets 26a, is resisted by engagement of the transmission elements 28 with the steeper sloped surfaces 32b of the disengagement pockets 32, and by the spring biasing thereof. The transmission elements 28 are thus retained within the disengagement pockets 32.

In this disengaged position, as mentioned hereinbefore, significant torque transmission through the torque limiter device, is prevented.

Figure 4E:
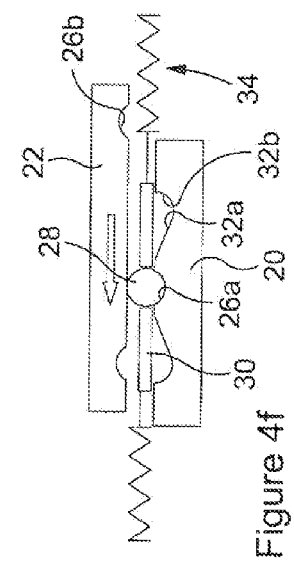
Figure 4B:
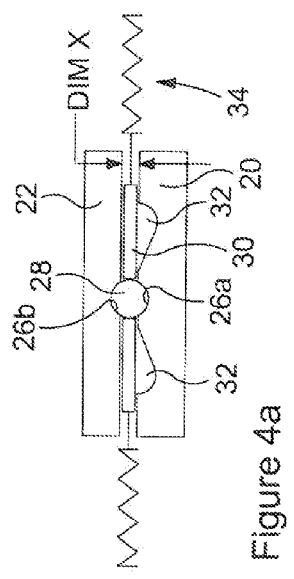
Figure 4D:
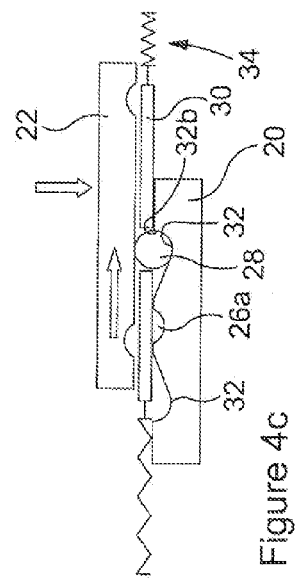
Figure 4F:
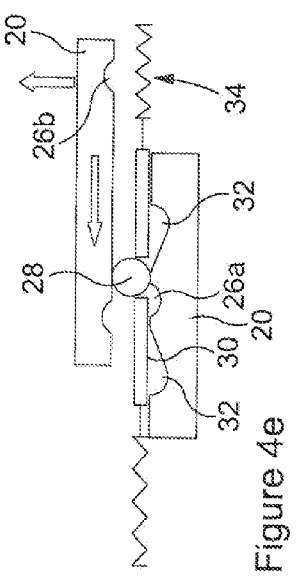

In a typical torque limiter device, if a position equivalent to the disengaged position is reached, re-setting of the torque limiter device requires a significant amount of work to be undertaken, typically requiring the torque limiter device to be dismantled to allow the transmission elements to be returned to the positions in which they are located within their respective transmission pockets. In accordance with the invention, however, the torque limiter device of this embodiment can be re-set by applying drive in the reverse direction. When reverse drive is applied, the transmission elements 28 will tend to ride up the more gently sloped surfaces 32a of the disengagement pockets 32, such movement being aided by the spring biasing of the support cage 30 which serves to urge the transmission elements 28 towards the transmission position, urging the transmission elements 28 up the more gently sloped surfaces 32a and into engagement with both the input flange 20 and the output flange 22 so that the applied drive can serve to move the transmission elements 28 towards the transmission position. As shown in FIG. 4d, such movement may by aided by the transmission element 28 having been caught by one of the transmission pockets 26b of the output flange 22. However, this need not always be the case and, as shown in FIGS. 4e and 4f, movement of the transmission elements 28 into the transmission pockets 26a of the input flange 20 may be completed before the transmission elements 28 enter the pockets 26b of the output flange 22. It will be appreciated that the return movement of the transmission elements 28 into the transmission pockets 26a, 26b arises in part due to the relatively gentle sloping of the surfaces 32a of the disengagement pockets 32 and in part due to the biasing of the support cage 30 and transmission elements 28 urging them towards a position in which they are aligned with the transmission pockets 26a and maintaining engagement between the transmission elements 28 and both flanges 20, 22.

Once the torque limiter device has been returned to a position in which the transmission elements 28 are located within the transmission pockets 26a, 26b, it will be appreciated that the transmission of drive between the input shaft 10 and output 12 is reinstated.

Figure 5:
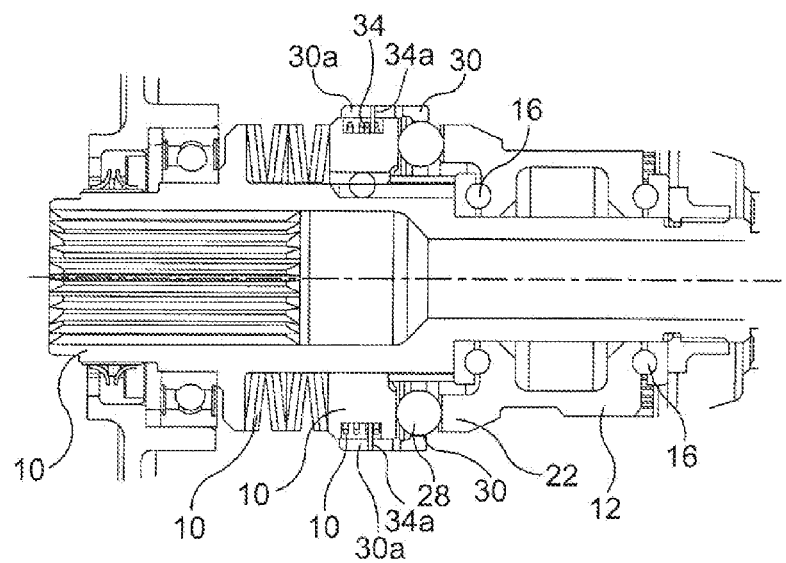
FIG. 5 is a view similar to FIG. 2 illustrating an alternative embodiment.

FIG. 5 illustrates an embodiment that, in many ways, is similar to that of FIGS. 1 to 4. In the embodiment of FIG. 5, the input flange 20 is axially movable relative to the input shaft 10, but is splined thereto by a ball-spline arrangement so that angular movement therebetween is resisted. The spring pack 24 engages the input flange 20, rather than the output 12 and output flange 22 which, in this embodiment, is supported against axial movement by the bearings 16. Operation of the device of FIG. 5 is substantially as described hereinbefore, with the exception that it is the input flange 20 rather than the output flange 22 that moves, axially.

FIG. 5 illustrates that the support cage 30 conveniently includes a series of fingers 30a that project over parts of the input flange 20. The input flange 20 defines recesses in which are accommodated torsion springs 34, each spring 34 being anchored to the input flange 20 and having a projecting limb 34a that engages a corresponding one of the fingers 30a so as to apply the biasing load thereto that biases the support cage 30, and hence the transmission elements 28 associated therewith, towards a position in which the transmission elements 28 are aligned with the transmission pockets 26a. It is envisaged that, although not shown in FIGS. 1 to 4, substantially this technique will be used to achieve biasing of the support cage 30 and transmission elements 28 of the embodiment described with reference to FIGS. 1 to 4.

Although the use of torsion springs is mentioned hereinbefore, it will be appreciated that compression spring or tension spring based arrangements are also possible.

Whilst FIG. 5 illustrates one technique that may be used to bias the transmission elements 28 towards the desired position, it will be appreciated that the invention is not restricted in this regard, and that a number of other techniques may be used without departing from the scope of the invention. Furthermore, a number of other modifications and alterations may be made without departing from the scope of the invention. By way of example, in some arrangements where torque is normally applied in just one rotary direction, or in which torque limitation in just one direction is sufficient, only one disengagement pocket 32 may be associated with each transmission element 28.

The invention claimed is:

1. A torque limiter device comprising a rotatable input having an input flange associated therewith, a rotatable output having an output flange associated therewith, the input flange and the output flange having opposing transmission pockets formed therein, a torque transmission element locatable within the opposing transmission pockets of the input and output flanges to transmit torque therebetween, at least one disengagement pocket arranged to receive the torque transmission element when the torque transmission element is in a disengaged position in which torque is not transmitted between the input flange and the output flange, and resilient biasing means biasing the torque transmission element towards a transmission position in which it is located within the opposing transmission pockets;
   wherein the torque transmission element is held captive to a support element;
   wherein the support element comprises a support cage; and
   wherein the resilient biasing means is arranged to bias the support element, and hence the torque transmission element, towards a predetermined angular position relative to the input flange.

2. A device according to claim 1, wherein the input and output flanges are radially extending flanges having surfaces which face one another, the transmission pockets being provided in the said surfaces, movement of the torque transmission element out of the transmission position forcing the surfaces, and hence the flanges, apart.

3. A device according to claim 1, wherein the resilient biasing means comprises a spring means carried by the input flange and engaged with the support element so as to bias the support element towards a predetermined angular position relative to the input flange in which the torque transmission element carried by the support element engages in the transmission pocket.

4. A device according to claim 3, wherein the spring means comprises at least one torsion spring, compression spring or tension spring.

5. A device according to claim 1, wherein the disengagement pocket has a ramped or sloped surface along which the torque transmission element rides to return from the disengaged position to the transmission position.

6. A device according to claim 5, wherein the ramped or sloped surface is relatively gently sloped.

7. A device according to claim 6, wherein the profile of the disengagement pocket is such that an opposing surface thereof is of steeper form than the relatively gentle slope of the ramped or sloped surface.

8. A device according to claim 1, wherein the disengagement pocket is formed on the input flange or the output flange.

9. A device according to claim 1, wherein a second disengagement pocket is provided to the opposite side of the transmission pocket to the first mentioned disengagement pocket.

10. A device according to claim 1, wherein a plurality of torque transmission elements and associated torque transmission pockets and disengagement pockets are provided.

11. A device according to claim 1, wherein the input and output flanges are spring biased towards one another.

* * * * *